United States Patent
Wang et al.

(10) Patent No.: US 10,212,403 B2
(45) Date of Patent: Feb. 19, 2019

(54) METHOD AND APPARATUS FOR REALIZING TRAPEZOIDAL DISTORTION CORRECTION OF PROJECTION PLANE

(71) Applicant: ZTE CORPORATION, Shenzhen, Guangdong Province (CN)

(72) Inventors: Yuchen Wang, Shenzhen (CN); Pengbo Li, Shenzhen (CN); Nan Jiang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/739,992

(22) PCT Filed: Dec. 18, 2015

(86) PCT No.: PCT/CN2015/097913
§ 371 (c)(1),
(2) Date: Dec. 27, 2017

(87) PCT Pub. No.: WO2016/131336
PCT Pub. Date: Aug. 25, 2016

(65) Prior Publication Data
US 2018/0192016 A1 Jul. 5, 2018

(30) Foreign Application Priority Data
Jul. 3, 2015 (CN) .......................... 2015 1 0390145

(51) Int. Cl.
G03B 21/14 (2006.01)
H04N 9/31 (2006.01)
H04N 5/74 (2006.01)

(52) U.S. Cl.
CPC .......... *H04N 9/3185* (2013.01); *G03B 21/14* (2013.01); *G03B 21/147* (2013.01); *H04N 5/74* (2013.01); *H04N 9/3194* (2013.01); *H04N 5/7408* (2013.01)

(58) Field of Classification Search
CPC ............ H04N 9/31; H04N 5/74; G03B 21/14
See application file for complete search history.

(56) References Cited

U.S. PATENT DOCUMENTS

| 8,730,130 | B1 * | 5/2014 | Pray ....................... G03B 37/04 345/8 |
| 2004/0061848 | A1 | 4/2004 | Kanemitsu et al. |
| 2018/0018761 | A1 * | 1/2018 | Tanaka ..................... G06T 5/006 |

FOREIGN PATENT DOCUMENTS

| CN | 1488990 | A | 4/2004 |
| CN | 1924693 | A | 3/2007 |
| CN | 104243879 | A | 12/2014 |
| CN | 105093789 | A | 11/2015 |
| JP | 2006-135675 | A | 5/2006 |

* cited by examiner

*Primary Examiner* — Sultan Chowdhury
*Assistant Examiner* — Danell L Owens
(74) *Attorney, Agent, or Firm* — Ling Wu; Stephen Yang; Ling and Yang Intellectual Property

(57) ABSTRACT

Disclosed are a method and an apparatus for correcting trapezoidal distortion of a projection plane. The method includes: measuring a trend of change in a distance to a projection plane by using a rotatable range finder, and determining a correction included angle according to the trend of change; and correcting trapezoidal distortion according to the determined correction included angle.

14 Claims, 6 Drawing Sheets

METHOD AND APPARATUS FOR REALIZING TRAPEZOIDAL DISTORTION CORRECTION OF PROJECTION PLANE

TECHNICAL FIELD

The present application relates to but is not limited to a projector technology.

BACKGROUND

When a projector is disposed and mounted, it is very difficult to make the projector to be perpendicular to a projection curtain and face right to a center point of the projection curtain. At this moment, diffusion of light projected from the side, near the projection curtain, of the projector is smaller than diffusion of light projected from the side, far away from the projection curtain, of the projector. As a result, widths of two sides of an image obtained through projection are different, and consequently a rectangular (square) image becomes trapezoidal. In order to solve trapezoidal image distortion, usually trapezoidal distortion correction is used. Trapezoidal distortion correction refers to shape adjustment and compensation performed by an electronic device on an image before projection through a difference algorithm. However, actual image quality is inevitably reduced.

For applications which do not have high requirements on image accuracy, digital trapezoidal distortion correction can very well solve trapezoidal image distortion, and the practicability is very strong. However, since some lines and character edges of an image become blurred and unsmooth and the definition is poor after the image is subjected to digital trapezoidal distortion correction, it is not suitable for applications which have high requirements on image accuracy, such as CAD drawing display. However, image distortion in a vertical direction caused during projection at an inclined angle can be corrected.

Trapezoidal distortion correction includes vertical trapezoidal distortion correction and horizontal trapezoidal distortion correction. In the related art, angles which can be corrected are limited in an automatic vertical trapezoidal distortion correction technology, a correction range is generally 0°-45°, projectors in the market usually reserve 5° and an actual range is 0°-40°. Since whether a projection plane is a wall or a ceiling cannot be recognized when an included angle between a projector and a horizontal plane exceeds 45° in the automatic vertical trapezoidal distortion correction technology in the related art, if the included angle between the projector and the horizontal angle exceeds 45°, the projection plane is a wall. However, if, at this moment, the projector has already considered that the projection plane is a ceiling, consequently the projector will perform trapezoidal distortion correction as a situation that the included angle is less than 45° when projecting to the ceiling, but the angle of projection to the wall is greater than 45° at this moment. Therefore, automatic vertical trapezoidal distortion correction in the related art cannot realize accurate trapezoidal distortion correction.

For horizontal trapezoidal distortion correction, only partial manufacturers launch manual horizontal trapezoidal distortion correction functions, principle of which are consistent with that of vertical trapezoidal distortion correction. However, automatic horizontal trapezoidal distortion correction functions are not realized, that is, an angle between a projector on a horizontal plane and a wall surface cannot be known.

SUMMARY

The following is a summary of the subject described in detail in this text. This summary is not used for limiting the protection scope of the claims.

The present disclosure provides a method and an apparatus for correcting trapezoidal distortion of a projection plane, which can automatically and accurately realize trapezoidal distortion correction.

A method for correcting trapezoidal distortion of a projection plane includes: measuring a trend of change in a distance between a projector and a projection plane by using a rotatable range finder, and determining a correction included angle according to the obtained trend of change; and correcting trapezoidal distortion of the projection plane according to the determined correction included angle.

In an exemplary embodiment, before measuring the trend of change in the distance between the projector and the projection plane by using the rotatable range finder, the method further includes:

determining an included angle between the projector and a horizontal plane, herein the included angle is greater than a preset first included angle threshold and an included angle between an upper projection boundary of the projector and the horizontal plane is less than a preset second included angle threshold.

In an exemplary embodiment, measuring the distance between the projector and the projection plane by using the rotatable range finder includes: measuring a first distance between a parallel direction of the projector and the projection plane and a second distance between a direction of the upper projection boundary of the projector and the projection plane by using the rotatable range finder.

In an exemplary embodiment, the step of measuring the trend of change in the distance between the projector and the projection plane by using the rotatable range finder includes:

if the trend of change from the first distance to the second distance is a decrease trend, determining that the projection plane is in parallel with the horizontal plane; and if the trend of change from the first distance to the second distance is an increase trend, determining that the projection plane is perpendicular to the horizontal plane.

In an exemplary embodiment, measuring the distance between the projector and the projection plane by using the rotatable range finder includes: measuring the second distance between the direction of the upper projection boundary of the projector and the projection plane and a third distance between a direction of a lower projection boundary of the projector and the projection plane.

In an exemplary embodiment, measuring the trend of change in the distance between the projector and the projection plane by using the rotatable range finder includes:

if the second distance is less than the third distance, determining that the projection plane is in parallel with the horizontal plane; and if the second distance is greater than the third distance, determining that the projection plane is perpendicular to the horizontal plane.

In an exemplary embodiment, the method further includes:

when the determined included angle between the projector and the horizontal plane is less than the first included angle threshold, determining that the projection plane is perpendicular to the horizontal plane; and when the included angle between the upper projection boundary of the projector and the horizontal plane is greater than the second included angle threshold, determining that the projection plane is in parallel with the horizontal plane.

In an exemplary embodiment, determining the correction included angle according to the trend of change includes:

when the projection plane is in parallel with the horizontal plane, determining that the correction included angle is an included angle between the projector along a projection center line and the horizontal plane; and when the projection plane is perpendicular to the horizontal plane, determining that the correction included angle is an included angle between the projector along a projection center line and the projection plane.

In an exemplary embodiment, measuring the distance between the projector and the projection plane by using the rotatable range finder includes:

scanning from a direction of any projection boundary to a direction of another projection boundary of the projector to obtain multiple distances between the projector and the projection plane.

In an exemplary embodiment, measuring the trend of change in the distance between the projector and the projection plane by using the rotatable range finder includes: determining that the multiple distances obtained through scanning have a trend of changing from great to small and then changing from small to great; and correspondingly, determining the correction included angle according to the trend of change as an included angle between the projector along a projection center line and a direction of a shortest distance.

In an exemplary embodiment, measuring the trend of change in the distance between the projector and the projection plane by using the rotatable range finder further includes: determining that the multiple distances obtained through scanning do not have a trend of changing from great to small and then changing from small to great;

the method further includes: scanning from a direction of the projection center line of the projector to a rear of the projector to obtain multiple distances between the projector and the projection plane, to determine a shortest distance between the projector and the projection plane; and correspondingly, determining the correction included angle according to the trend of change as a correction included angle whose cosine value is a ratio of the shortest distance to the distance between the projector along the projection center line and the projection plane.

A method for correcting trapezoidal distortion of a projection plane includes:

determining an included angle between a projector and a horizontal plane, and when the determined included angle between the projector and the horizontal plane is greater than a preset first included angle threshold and an included angle between an upper projection boundary of the projector and the horizontal plane is less than a preset second included angle threshold, measuring a trend of change in a distance between the projector and a projection plane by using a rotatable range finder, and determining a correction included angle according to the trend of change; and correcting trapezoidal distortion of the projection plane according to the determined correction included angle.

In an exemplary embodiment, measuring the distance between the projector and the projection plane by using the rotatable range finder includes: measuring a first distance between a parallel direction of the projector and the projection plane and a second distance between the direction of the upper projection boundary of the projector and the projection plane by using the rotatable range finder; and measuring the trend of change in the distance between the projector and the projection plane by using the rotatable range finder includes:

if the trend of change from the first distance to the second distance is a decrease trend, determining that the projection plane is in parallel with the horizontal plane; and if the trend of change from the first distance to the second distance is an increase trend, determining that the projection plane is perpendicular to the horizontal plane.

In an exemplary embodiment, measuring the distance between the projector and the projection plane by using the rotatable range finder includes: measuring a second distance between the direction of the upper projection boundary of the projector and the projection plane and a third distance between the direction of a lower projection boundary of the projector and the projection plane by using the rotatable range finder; and measuring the trend of change in the distance between the projector and the projection plane by using the rotatable range finder includes:

if the second distance is less than the third distance, determining that the projection plane is in parallel with the horizontal plane; and if the second distance is greater than the third distance, determining that the projection plane is perpendicular to the horizontal plane.

In an exemplary embodiment, the method further includes:

when the determined included angle between the projector and the horizontal plane is less than the first included angle threshold, determining that the projection plane is perpendicular to the horizontal plane; and when the included angle between the upper projection boundary of the projector and the horizontal plane is greater than the second included angle threshold, determining that the projection plane is in parallel with the horizontal plane.

In an exemplary embodiment, determining the correction included angle according to the trend of change includes:

when the projection plane is in parallel with the horizontal plane, determining that the correction included angle is an included angle between the projector along a projection center line and the horizontal plane; and when the projection plane is perpendicular to the horizontal plane, determining that the correction included angle is an included angle between the projector along a projection center line and a wall surface.

A method for correcting trapezoidal distortion of a projection plane includes: scanning from a direction of any projection boundary to a direction of another projection boundary of a projector to obtain multiple distances between the projector and a projection plane;

if the multiple distances obtained through scanning have a trend of changing from great to small and then changing from small to great, determining that the correction included angle is an included angle between the projector along a projection center line and the direction of the shortest distance; and correcting trapezoidal distortion according to the determined correction included angle.

In an exemplary embodiment, measuring the trend of change in the distance between the projector and the projection plane by using the rotatable range finder includes: determining that the multiple distances obtained through scanning have a trend of changing from great to small and then changing from small to great; and correspondingly, determining the correction included angle according to the trend of change includes: determining that the correction included angle is an included angle between the projector along a projection center line and the direction of the shortest distance, i.e., an actual included angle between the projector on the horizontal plane and the projection plane.

In an exemplary embodiment, measuring the trend of change in the distance between the projector and the projection plane by using the rotatable range finder further includes: determining that the multiple distances obtained through scanning do not have a trend of changing from great to small and then changing from small to great;

the method further includes: scanning from the direction of the projection center line of the projector to a rear of the projector to obtain multiple distances between the projector and the projection plane, to determine the shortest distance between the projector and the projection plane; and correspondingly, determining the correction included angle according to the trend of change includes: determining the correction included angle as a correction included angle whose cosine value is a ratio of the shortest distance to the distance between the projector along the projection center line and the projection plane.

An apparatus for correcting trapezoidal distortion of a projection plane includes a determination unit and a correction unit, herein:

the determination unit is configured to: measure a trend of change in a distance between a projector and a projection plane by using a rotatable range finder, and determine a correction included angle according to the obtained trend of change; and the correction unit is configured to: correct trapezoidal distortion of the projection plane according to the determined correction included angle.

In an exemplary embodiment, the determination unit includes: a first measurement module, a second measurement module, a first judgment module and a first processing module; and the correction unit includes: a first correction module, herein, the first measurement module is configured to: determine an included angle between the projector and a horizontal plane, and output the included angle to the first judgment module;

the second measurement module is configured to: determine an included angle between an upper projection boundary of the projector and the horizontal plane, and output the included angle to the first judgment module;

the first judgment module is configured to: determine whether the projection plane is perpendicular to the horizontal plane or in parallel with the horizontal plane according to the included angle between the projector and the horizontal plane coming from the first measurement module, the included angle between the upper projection boundary of the projector and the horizontal plane coming from the second measurement module and the trend of change in the distance between the projector and the projection plane, and output a first notification or a second notification to the first processing module;

the first processing module is configured to: when the first notification is received, determine that the correction included angle is an included angle between the projector along a projection center line and the horizontal plane; and when the second notification is received, determine that the correction included angle is an included angle between the projector along a projection center line and a wall surface, and output the determined correction included angle to the first correction module; and the first correction module is configured to: correct trapezoidal distortion according to the determined correction included angle.

In an exemplary embodiment, the first judgment module is configured to:

when the included angle between the projector and the horizontal plane is greater than a preset first included angle threshold and the included angle between the upper projection boundary of the projector and the horizontal plane is less than a second included angle threshold, measure the trend of change in the distance between the projector and the projection plane by using the rotatable range finder, and output a first notification or a second notification to the first processing module according to the trend of change.

In an exemplary embodiment, the first judgment module is configured to:

when the distance between the projector and the projection plane measured by the rotatable range finder includes: a first distance between a parallel direction of the projector and the projection plane measured by the rotatable range finder and a second distance between the direction of the upper projection boundary of the projector and the projection plane measured by the rotatable range finder, if the trend of change from the first distance to the second distance is a decrease trend, determine that the projection plane is a ceiling and send a second notification to the first processing module; and if the trend of change from the first distance to the second distance is an increase trend, determine that the projection plane is perpendicular to the horizontal plane and send a first notification to the first processing module;

or, when the distance between the projector and the projection plane measured by the rotatable range finder includes: a second distance between the direction of the upper projection boundary of the projector and the projection plane measured by the rotatable range finder and a third distance between the direction of a lower projection boundary of the projector and the projection plane measured by the rotatable range finder, if the second distance is less than the third distance, determine that the projection plane is in parallel with the horizontal plane, and send a second notification to the first processing module; and if the second distance is greater than the third distance, determine that the projection plane is perpendicular to the horizontal plane, and send a first notification to the first processing module.

In an exemplary embodiment, the first judgment module is further configured to:

when the included angle between the projector and the horizontal plane is less than the first included angle threshold, determine that the projection plane is perpendicular to the horizontal plane, and send a first notification to the first processing module; and when the included angle between the upper projection boundary of the projector and the horizontal plane is greater than the second included angle threshold, determine that the projection plane is in parallel with the horizontal plane, and send a second notification to the first processing module.

In an exemplary embodiment, the determination unit includes: a first scanning module, a second judgment module and a second processing module; and the correction unit includes: a second correction module, herein, the first scanning module is configured to: scan from a direction of any projection boundary to a direction of another projection boundary of the projector to obtain multiple distances between the projector and the projection plane, and output the multiple distances to the second judgment module;

the second judgment module is configured to: determine that the multiple distances obtained through scanning have a trend of changing from great to small and then changing from small to great, and send a third notification to the second processing module;

the second processing module is configured to: when the third notification is received, determine that the correction included angle is an included angle between the projector along a projection center line and a direction of a shortest distance; and output the correction included angle to the second correction module; and the second correction module is configured to: correct trapezoidal distortion according to the determined correction included angle.

In an exemplary embodiment, the determination unit further includes a second scanning module; at this moment, the second judgment module is further configured to: determine that the multiple distances obtained through scanning do not have a trend of changing from great to small and then changing from small to great, and send a notification to the second scanning module;

the second scanning module is configured to: receive the notification coming from the second judgment module, and scan from the direction of the projection center line of the projector to a rear of the projector to obtain multiple distances between the projector and the projection plane, to determine the shortest distance between the projector and the projection plane; and output the obtained shortest distance to the second processing module; and the second processing module is further configured to: determine the correction included angle according to that a cosine value of the correction included angle is a ratio of the determined shortest distance to the distance between the projector along the projection center line and the projection plane, and output the correction included angle to the second correction module.

A projector includes the apparatus for correcting trapezoidal distortion of the projection plane.

A computer-readable storage medium stores computer-executable instructions used for executing any one of the above methods.

As compared with the related art, the scheme of the present application includes: measuring a trend of change in a distance between a projector and a projection plane by using a rotatable range finder, and determining a correction included angle according to the obtained trend of change; and correcting trapezoidal distortion of the projection plane according to the determined correction included angle. By using the method provided by the embodiment of the present disclosure, trapezoidal distortion correction can be automatically and accurately realized.

When trapezoidal distortion correction is vertical trapezoidal distortion correction, the method includes: determining an included angle between a projector and a horizontal plane; and when the determined included angle between the projector and the horizontal plane is greater than a first included angle threshold and an included angle between an upper projection boundary of the projector and the horizontal plane is less than a second included angle threshold, measuring a trend of change in a distance between the projector and a projection plane by using a rotatable range finder, and determining a correction included angle according to the trend of change; and correcting trapezoidal distortion according to the determined correction included angle.

When trapezoidal distortion correction is horizontal trapezoidal distortion correction, the method includes: scanning from the direction of any projection boundary to the direction of another projection boundary of a projector to obtain multiple distances between the projector and a projection plane; if the multiple distances obtained through scanning have a trend of changing from great to small and then changing from small to great, determining that the correction included angle is an included angle between the projector along a projection center line and the direction of the shortest distance, i.e., an actual included angle between the projector on the horizontal plane and the projection plane; and correcting trapezoidal distortion according to the determined correction included angle.

After the drawings and detailed description are read and understood, other aspects can be understood.

DETAILED DESCRIPTION

Embodiments of the present disclosure will be described below in detail with reference to the drawings. It needs to be stated that embodiments in the present application and features in the embodiments may be mutually and freely combined under a situation of no conflict.

Figure 1:
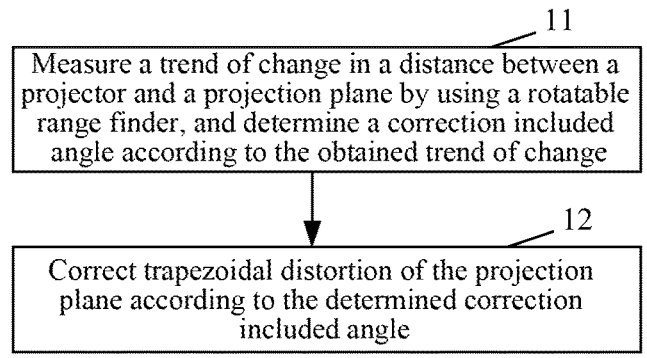
FIG. 1 illustrates a flowchart of a method for correcting trapezoidal distortion of a projection plane according to an embodiment of the present disclosure.

As illustrated in FIG. 1, a method for correcting trapezoidal distortion of a projection plane provided by an embodiment of the present disclosure includes the following steps.

In step 11, a trend of change in a distance between a projector and a projection plane is measured by using a rotatable range finder, and a correction included angle is determined according to the obtained trend of change.

In step 12, trapezoidal distortion of the projection plane is corrected according to the determined correction included angle.

By using the method provided by the embodiment of the present disclosure, trapezoidal distortion correction can be automatically and accurately realized.

Herein, when trapezoidal distortion correction is automatic vertical trapezoidal distortion correction, measuring the distance between the projector and the projection plane by using the rotatable range finder includes: measuring a first distance between a parallel direction of the projector and the projection plane and a second distance between the direction of an upper projection boundary of the projector and the projection plane by using the rotatable range finder. At this moment, measuring the trend of change in the distance between the projector and the projection plane by using the rotatable range finder includes: if the trend of change from the first distance to the second distance is a decrease trend, indicating that the projection plane is in parallel with a horizontal plane, i.e., the projection plane is a ceiling; and if the trend of change from the first distance to the second distance is an increase trend, indicating that the projection plane is perpendicular to the horizontal plane, i.e., the projection plane is a wall.

Or, measuring the distance between the projector and the projection plane by using the rotatable range finder includes: measuring a second distance between the direction of an upper projection boundary of the projector and the projection plane and a third distance between the direction of a lower projection boundary of the projector and the projection plane. At this moment, measuring the trend of change in the distance between the projector and the projection plane by using the rotatable range finder includes: if the second distance is less than the third distance, indicating that the projection plane is in parallel with the horizontal plane, i.e., the projection plane is a ceiling; and if the second distance is greater than the third distance, indicating that the projection plane is perpendicular to the horizontal plane, i.e., the projection plane is a wall.

Correspondingly, determining the correction included angle according to the trend of change includes: when the projection plane is in parallel with the horizontal plane, i.e., the projection plane is the ceiling, determining that the correction included angle is an included angle between the projector along a projection center line, i.e., the direction of a projection optical machine, and the horizontal plane; and when the projection plane is perpendicular to the horizontal plane, i.e., the projection plane is the wall, determining that the correction included angle is an included angle between the projector along a projection center line and the projection plane, i.e., a wall surface.

In an automatic vertical trapezoidal distortion correction mode before measuring the trend of change in the distance, the method further includes: determining an included angle between the projector and the horizontal plane, i.e., an included angle between the projector along the projection center line and the horizontal plane, herein the included angle is greater than a preset first included angle threshold and an included angle between the upper projection boundary of the projector and the horizontal plane is less than a preset second included angle threshold.

When the determined included angle between the projector and the horizontal plane is less than the first included angle threshold, it is indicated that the projection plane is perpendicular to the horizontal plane, i.e., the projection plane is a wall.

When the included angle between the upper projection boundary of the projector and the horizontal plane is greater than the second included angle threshold, it is indicated that the projection plane is in parallel with the horizontal plane, i.e., the projection plane is a ceiling.

Herein, when trapezoidal distortion correction is automatic horizontal trapezoidal distortion correction, measuring the distance between the projector and the projection plane by using the rotatable range finder includes: scanning from a direction of any projection boundary to a direction of another projection boundary of the projector to obtain multiple distances (such as obtaining according to a preset period) between the projector and the projection plane.

At this moment, measuring the trend of change in the distance between the projector and the projection plane by using the rotatable range finder includes: if the multiple distances obtained through scanning have a trend of changing from great to small and then changing from small to great, correspondingly, the correction included angle is determined according to the trend of change as an included angle between the projector along a projection center line and the direction of the shortest distance, i.e., an actual included angle between the projector on the horizontal plane and the projection plane. If the multiple distances obtained through scanning do not have a trend of changing from great to small and then changing from small to great, the method further includes: scanning from the direction of the projection center line of the projector to a rear of the projector to obtain multiple distances between the projector and the projection plane, so as to determine the shortest distance between the projector and the projection plane. Correspondingly, the correction included angle is determined according to the trend of change as a correction included angle whose cosine value is a ratio of the shortest distance to the distance between the projector along the projection center line and the projection plane.

In order to implement the method provided by the embodiment of the present disclosure, a rotatable range finder is built in the projector, which can detect an inclination angle of the projector, i.e., the included angle between the projector and the projection plane. Thereby a digital adjustment system of the projector can automatically correct trapezoidal distortion of an image according to the inclination angle. In other words, trapezoidal distortion correction can be automatically performed simply by the included angle between the projector and the projection plane. The range finder may be a laser range finder, an infrared range finder or an ultrasonic range finder, which can measure the distance between the instrument and a directly-opposite surface according to different principles. A rotation angle sensor may determine an angle of rotation according to a rotating speed and a rotating time of the sensor itself. The rotatable range finder is formed by a range finder and a rotation angle sensor through connection, the rotation angle sensor drives the range finder to rotate and scan, and the angle is determined through the rotation angle sensor.

Figure 2:
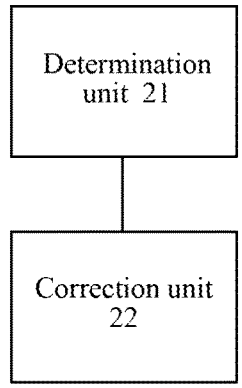
FIG. 2 illustrates a schematic diagram of an apparatus for correcting trapezoidal distortion of a projection plane according to an embodiment of the present disclosure.

As illustrated in FIG. 2, based on the method for correcting trapezoidal distortion of the projection plane, an apparatus for correcting trapezoidal distortion of a projection plane provided by the embodiment of the present disclosure includes: a determination unit 21 and a correction unit 22.

The determination unit 21 is configured to: measure a trend of change in a distance between a projector and a projection plane by using a rotatable range finder, and determine a correction included angle according to the obtained trend of change.

The correction unit 22 is configured to correct trapezoidal distortion of the projection plane according to the determined correction included angle.

Figure 3:
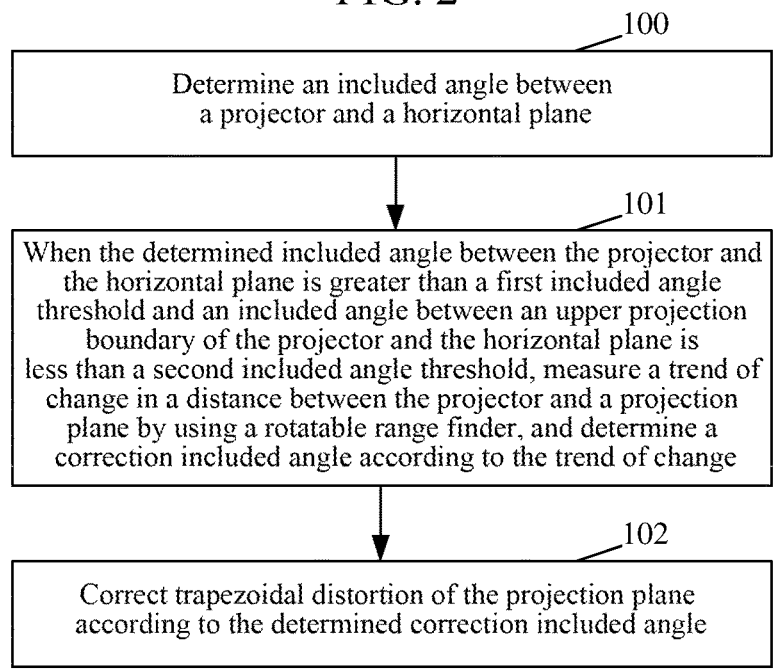
FIG. 3 illustrates a flowchart of a method for correcting trapezoidal distortion of a projection plane according to an embodiment of the present disclosure.

FIG. 3 illustrates a flowchart of a method for correcting trapezoidal distortion correction of a projection plane when trapezoidal distortion correction is automatic vertical trapezoidal distortion correction according to one embodiment of the present disclosure. As illustrated in FIG. 3, after a projector is disposed and fixed, the method includes the following steps.

In step 100, an included angle between a projector and a horizontal plane is determined.

In this step, the included angle between the projector and the horizontal plane is an included angle between the projector along a projection center line and the horizontal plane. The size of the included angle may be measured by a gyroscope.

In step 101, when the determined included angle between the projector and the horizontal plane is greater than a first included angle threshold and an included angle between an upper projection boundary of the projector and the horizontal plane is less than a second included angle threshold, a trend of change in a distance between the projector and a projection plane is measured by using a rotatable range finder, and a correction included angle is determined according to the trend of change.

In this step, the first included angle threshold may be 45° and the second included angle threshold may be 90°.

In this step, measuring the distance between the projector and the projection plane by using the rotatable range finder includes: measuring a first distance between a parallel direction of the projector and the projection plane and a second distance between the direction of the upper projection boundary of the projector and the projection plane by using the rotatable range finder. At this moment, measuring the trend of change in the distance between the projector and the projection plane by using the rotatable range finder includes: if the trend of change from the first distance to the second distance is a decrease trend, indicating that the projection plane is in parallel with the horizontal plane, i.e., the projection plane is a ceiling; and if the trend of change from the first distance to the second distance is an increase trend, indicating that the projection plane is perpendicular to the horizontal plane, i.e., the projection plane is a wall.

Or, in this step, measuring the distance between the projector and the projection plane by using the rotatable range finder includes: measuring a second distance between the direction of the upper projection boundary of the projector and the projection plane and a third distance between the direction of a lower projection boundary of the projector and the projection plane by using the rotatable range finder. At this moment, measuring the trend of change in the distance between the projector and the projection plane by using the rotatable range finder includes: if the second distance is less than the third distance, indicating that the projection plane is in parallel with the horizontal plane, i.e., the projection plane is a ceiling; and if the second distance is greater than the third distance, indicating that the projection plane is perpendicular to the horizontal plane, i.e., the projection plane is a wall.

Step 101 further includes: when the determined included angle between the projector and the horizontal plane is less than the first included angle threshold, indicating that the projection plane is perpendicular to the horizontal plane, i.e., the projection plane is a wall; and when the included angle between the upper projection boundary of the projector and the horizontal plane is greater than the second included angle threshold, indicating that the projection plane is in parallel with the horizontal plane, i.e., the projection plane is a ceiling.

In step 101, determining the correction included angle according to the trend of change includes:

when the projection plane is in parallel with the horizontal plane, i.e., the projection plane is the ceiling, determining that the correction included angle is an included angle between the projector along a projection center line and the horizontal plane; and when the projection plane is perpendicular to the horizontal plane, i.e., the projection plane is the wall, determining that the correction included angle is an included angle between the projector along a projection center line and a wall surface.

In step 102, trapezoidal distortion of the projection plane is corrected according to the determined correction included angle.

Figure 4:
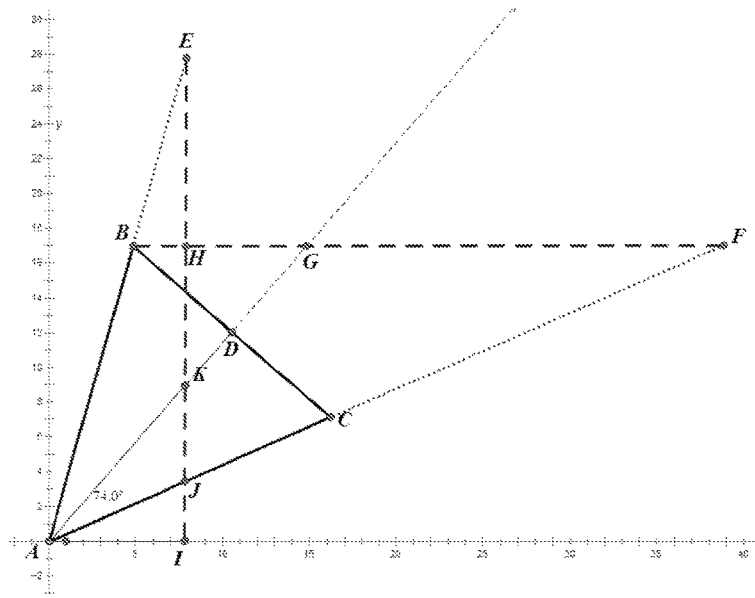
FIG. 4 illustrates a schematic view of determining a projection plane based on the method illustrated in FIG. 3 according to an embodiment of the present disclosure.

FIG. 4 illustrates a schematic view of determining a projection plane based on the method illustrated in FIG. 3 according to an embodiment of the present disclosure. As illustrated in FIG. 4, supposing that point A is a position at which a projector is located, connecting line AD is a direction of a projection optical machine, i.e., the projector along a projection center line, and connecting line AB and connecting line AC are respectively projection boundaries of the projection optical machine. Herein connecting line AB is an upper projection boundary and connecting line AC is a lower projection boundary. Connecting line AG is a projection center line, and an included angle between the direction AD of the projection optical machine and the horizontal plane AI is 74°.

A rotation angle range of a rotatable range finder is an angle range of the upper and lower projection boundaries of the projector, i.e., angle BAC. In order to decrease distance measurement and judgment time, dual range finders may also be used to simultaneously measure a distance from the projector to the upper projection boundary and a distance from the projector to the lower projection boundary, i.e., simultaneously measure the distance in direction AB and the distance in direction AF.

If the projection plane is a ceiling, i.e., plane BF, the rotatable range finder scans the distance from the direction AD of the projection optical machine to the upper projection boundary AB. From FIG. 4, it can be seen that the distance AG between the direction AD of the projector and the ceiling BF is longer than the distance AB between the projector and the ceiling BF. As long as the projection optical machine exceeds 45° and the included angle between the upper projection boundary AB and the horizontal plane is less than 90°, only at this moment the projector possibly has two situations, i.e., the projection plane may be a ceiling and the projection plane may also be a wall surface. If the included angle between the distance AB and the horizontal plane exceeds 90° and is less than 180°, the situation that the projection plane is the wall surface does not possibly exist and thus the situation that the angle ABF is an obtuse angle is the only case. According to the theorem that an opposite side (AG) of an obtuse angle (ABG) of an obtuse triangle (AGB) is greater than any other side (AB), it can be seen that the distance AB is always less than the distance AG and this is unrelated to the height of the ceiling. Conclusively, it can be deduced that, under a situation that the included angle between the projection optical machine and the horizontal plane is less than 45°, the range finder scans the distance from the direction of the optical machine to an acute angle perpendicular to a horizontal direction; and if the distance is in a decrease trend, the projection plane is the ceiling. At this moment the included angle between the projector along the projection center line and the projection plane is AGB=74°.

If the projection plane is a wall, i.e., plane EI, the rotatable range finder scans the distance from the direction AD of the projection optical machine to the direction of the upper projection boundary AB. From FIG. 4, it can be seen that the distance AK between the projector and the wall surface is less than the distance between the projector and the projection boundary AE. According to the theorem, it can be seen that a side (AF) opposite an obtuse angle (AKE) of an obtuse triangle (AEK) is greater than any other side (AK) and this is unrelated to the distance between the projector and the wall surface. As long as the included angle between the projection optical machine and the horizontal plane is greater than 0°, AKE is always an obtuse angle. Conclusively, it can be deduced that, under a situation that the included angle between the optical machine and the horizontal plane is greater than 45°, the range finder scans the distance from the direction of the optical machine to an acute angle perpendicular to a horizontal direction; and if the distance shows an increase trend, the projection plane is the wall. At this moment the included angle between the projector along the projection center line and the wall surface is AKI=(90°−74°).

Figure 5:
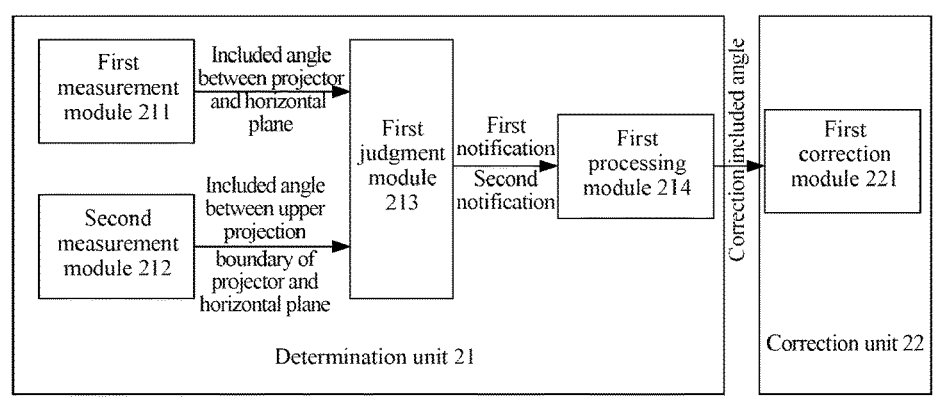
FIG. 5 illustrates a structural schematic diagram of an apparatus for correcting trapezoidal distortion of a projection plane according to an embodiment of the present disclosure.

FIG. 5 illustrates a structural schematic diagram of an apparatus for correcting trapezoidal distortion of a projection plane according to FIG. 2. As illustrated in FIG. 5, the determination unit 21 includes: a first measurement module 211, a second measurement module 212, a first judgment module 213 and a first processing module 214; and the correction unit 22 includes: a first correction module 221.

The first measurement module 211 is configured to: determine an included angle between the projector and a horizontal plane, and output the included angle to the first judgment module 214. After the position of the projector is fixed, the included angle may be measured by a gyroscope.

The second measurement module 212 is configured to: determine an included angle between an upper projection boundary of the projector and the horizontal plane, and output the included angle to the first judgment module 214. The included angle may be measured by the gyroscope.

The first judgment module 213 is configured to: determine that the projection plane is the wall if the projection plane is perpendicular to the horizontal plane, or is a ceiling if the projection plane is in parallel with the horizontal plane, according to the included angle between the projector and the horizontal plane coming from the first measurement module 211, the included angle between the upper projection boundary of the projector and the horizontal plane coming from the second measurement module 212 and the trend of change in the distance between the projector and the projection plane.

The first judgment module 213 is configured to:

when the included angle between the projector and the horizontal plane is greater than a first included angle threshold and the included angle between the upper projection boundary of the projector and the horizontal plane is less than a second included angle threshold, measure the trend of change in the distance between the projector and the projection plane by using the rotatable range finder, and output a first notification or a second notification to the first processing module 214 according to the trend of change.

Herein, when the distance between the projector and the projection plane measured by the rotatable range finder includes a first distance between a parallel direction of the projector and the projection plane measured by the rotatable range finder and a second distance between the direction of the upper projection boundary of the projector and the projection plane measured by the rotatable range finder, if the trend of change from the first distance to the second distance is a decrease trend, it is indicated that the projection plane is in parallel with the horizontal plane, i.e., the projection plane is a ceiling and a second notification is sent to the first processing module 214; and if the trend of change from the first distance to the second distance is an increase trend, it is indicated that the projection plane is perpendicular to the horizontal plane, i.e., the projection plane is a wall, and a first notification is sent to the first processing module 214.

Or, when the distance between the projector and the projection plane measured by the rotatable range finder includes: a second distance between the direction of the upper projection boundary of the projector and the projection plane measured by the rotatable range finder and a third distance between the direction of a lower projection boundary of the projector and the projection plane measured by the rotatable range finder, if the second distance is less than the third distance, it is indicated that the projection plane is in parallel with the horizontal plane, i.e., the projection plane is a ceiling, and a second notification is sent to the first processing module 214; and if the second distance is greater than the third distance, it is indicated that the projection plane is perpendicular to the horizontal plane, i.e., the projection plane is a wall, and a first notification is sent to the first processing module 214.

In an embodiment of the present disclosure, the first judgment module 213 is further configured to:

when the included angle between the projector and the horizontal plane is less than the first included angle threshold, indicate that the projection plane is perpendicular to the horizontal plane, i.e., the projection plane is a wall, and send a first notification to the first processing module 214; and when the included angle between the upper projection boundary of the projector and the horizontal plane is greater than the second included angle threshold, indicate that the projection plane is in parallel with the horizontal plane, i.e., the projection is a ceiling, and send a second notification to the first processing module 214.

The first processing module 214 is configured to: when the first notification is received, determine that the correction included angle is an included angle between the projector along a projection center line and the horizontal plane; and when the second notification is received, determine that the correction included angle is an included angle between the projector along a projection center line and a wall surface, and output the determined correction included angle to the first correction module 221.

The first correction module 221 is configured to: correct trapezoidal distortion according to the determined correction included angle.

Figure 6:
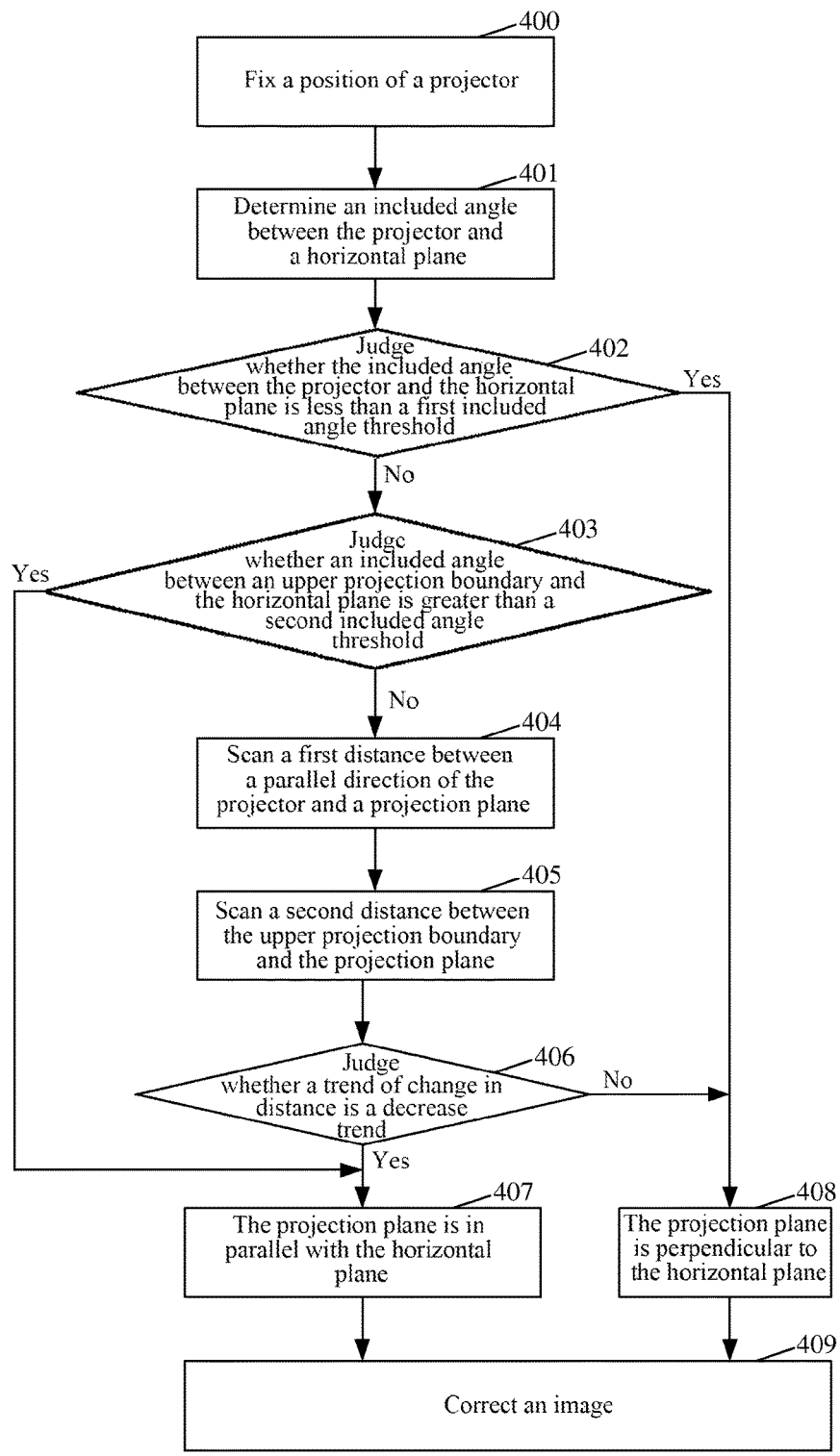
FIG. 6 illustrates a flowchart of one embodiment based on the method illustrated in FIG. 3 according to an embodiment of the present disclosure.

FIG. 6 illustrates a flowchart of one embodiment based on the method illustrated in FIG. 3 according to an embodiment of the present disclosure. In this embodiment, a preset first included angle threshold is 45° and a preset second included angle threshold is 90°. As illustrated in FIG. 6, the process includes the following steps.

In step 400, a position of a projector is fixed, i.e., a projector detects that the position does not change any longer.

In step 401, a gyroscope determines an included angle between the projector and a horizontal plane.

In step 402, whether the included angle between the projector (i.e., a parallel direction of a projection optical machine, also i.e., a projection center line of a projection optical machine) and the horizontal plane is less than a preset first included angle threshold, i.e., 45°, is judged, if the included angle is less than 45°, step 408 is executed; and otherwise, step 403 is executed.

In step 403, whether an included angle between an upper projection boundary of the projector and the horizontal plane is greater than 90° is judged, if the included angle is greater than 90°, a situation that a projection plane is perpendicular to the horizontal plane does not exist and step 407 is executed; and otherwise, step 404 is executed.

In step 404, at this moment, the included angle between the projection center line of the projection optical machine and the horizontal direction is greater than 45° and the included angle between the upper projection boundary and the horizontal plane is less than 90°, a rotatable range finder scans and stores a first distance between the projector in the parallel direction of the projection optical machine and the projection plane.

In step 405, the rotatable range finder scans and stores a second distance between the projector and the projection plane from the direction of the upper projection boundary of the projector.

In step 406, whether a trend of change from the first distance to the second distance is a decrease trend is judged, if yes, step 407 is executed; and if not, step 408 is executed.

This step may also be as follow: when it is directly judged that the distance between the upper projection boundary of the projector and the projection plane is less than the distance between a lower projection boundary of the projector and the projection plane, step 407 is executed; and when it is directly judged that the distance between the upper projection boundary of the projector and the projection plane is greater than the distance between the lower projection boundary of the projector and the projection plane, step 408 is executed.

In step 407, it is judged that the projection plane is in parallel with the horizontal plane, i.e., the projection plane is a ceiling. At this moment, a correction included angle, i.e., the included angle between the projector and the projection plane, is the included angle between the projector along the projection center line and the horizontal plane, and step 409 is executed.

In step 408, it is judged that the projection plane is perpendicular to the horizontal plane, i.e., the projection plane is a wall. At this moment, the correction included angle, i.e., the included angle between the projector and the projection plane, is the included angle between the projector along the projection center line and a wall surface.

In step 409, an image is corrected according to the obtained correction included angle, i.e., the included angle between the projector and the projection plane, and the corrected image is output by the projection optical machine.

Figure 7:
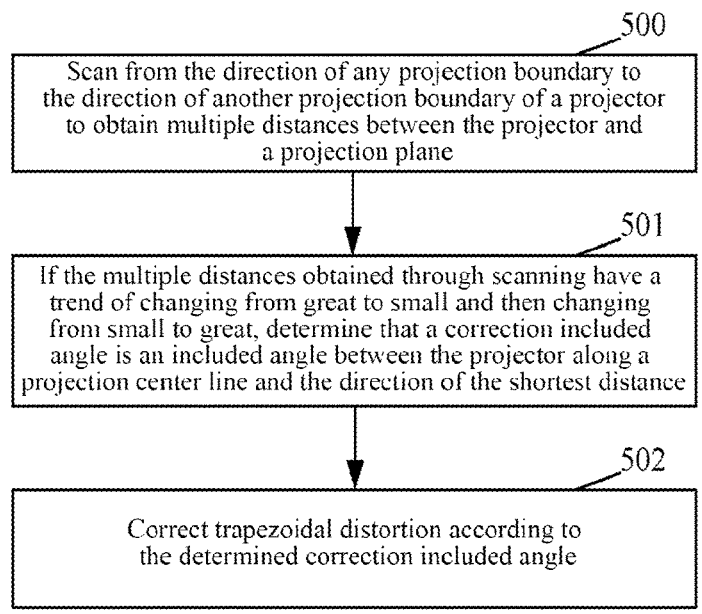
FIG. 7 illustrates a flowchart of another method for correcting trapezoidal distortion of a projection plane according to an embodiment of the present disclosure.

FIG. 7 illustrates a flowchart of another method for correcting trapezoidal distortion of a projection plane according to an embodiment of the present disclosure. As illustrated in FIG. 7, the method includes the following steps.

In step 500, scanning is performed from the direction of any projection boundary to the direction of another projection boundary of a projector to obtain multiple distances between the projector and a projection plane.

In this step, the distances between the projector and the projection plane may be obtained by scanning in a projection range of the projector through a front rotatable range finder of the projector.

In this step, distance values may be acquired according to a preset sampling period; and distance values at corresponding positions may also be acquired according to a preset fixed sampling number, as long as a trend of change of the obtained distance values in the projection range can be obtained. Herein, the sampling period may be determined according to the distance between the projector and the projection plane, the greater the distance is, the shorter the sampling period is, and the less the distance is, the longer the sampling period is.

In step 501, if the multiple distances obtained through scanning have a trend of changing from great to small and then changing from small to great, it is determined that a correction included angle is an included angle between the projector along a projection center line and the direction of the shortest distance, i.e., an actual included angle between the projector on a horizontal plane and the projection plane.

In this step, the correction included angle may be measured by a rotation angle sensor. It is emphasized here that the correction included angle is determined as an actual included angle between the projector on the horizontal plane and the projection plane only when there is a trend of changing from great to small and then changing from small to great.

If the multiple distances obtained through scanning do not have a trend of changing from great to small and then changing from small to great, this step further includes:

It is to scan from the direction of the projection center line of the projector to a rear of the projector through a side rotatable range finder of the projector to obtain multiple distances between the projector and the projection plane, so as to determine the shortest distance between the projector and the projection plane. At this moment, a cosine value of the correction included angle is a ratio of the determined shortest distance to the distance between the projector along the projection center line and the projection plane.

In step 502, trapezoidal distortion is corrected according to the determined correction included angle.

Figure 8A:
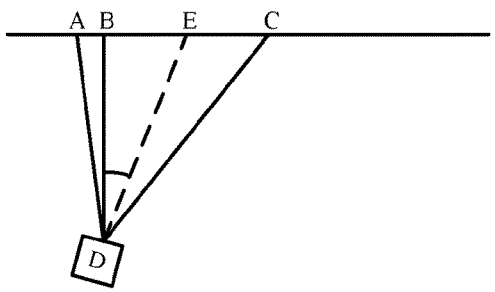
FIG. 8(a) illustrates a schematic view of embodiment 1 for determining the shortest distance based on the method illustrated in FIG. 7 according to the present disclosure.

FIG. 8(a) illustrates a schematic view of embodiment 1 for determining the shortest distance based on the method illustrated in FIG. 7 according to the present disclosure. In embodiment 1, the shortest distance exists in a projection range. As illustrated in FIG. 8(a), connecting line DE is a projection center line and is located between left projection boundary AD and right projection boundary CD, and there is a shortest distance, i.e., connecting line BD. According to that a perpendicular line from a vertex of a triangle to an opposite side is the shortest, it can be seen that connecting line BD is a perpendicular distance from a projector to a projection plane, and at this moment angle EDB may be determined by a rotation angle sensor.

Figure 8B:
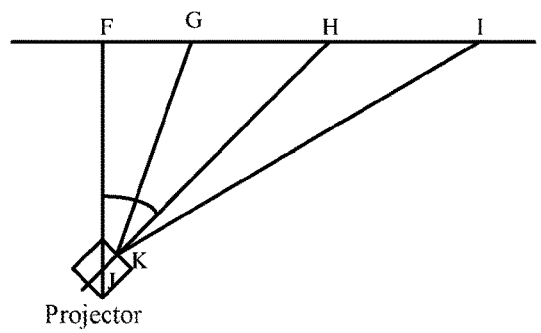
FIG. 8(b) illustrates a schematic view of embodiment 2 for determining the shortest distance based on the method illustrated in FIG. 7 according to the present disclosure.

FIG. 8(b) illustrates a schematic view of embodiment 2 for determining the shortest distance based on the method illustrated in FIG. 7 according to the present disclosure. In embodiment 2, an angle between the projector and the projection plane on the horizontal plane is too large. As illustrated in FIG. 8(b), the shortest distance in the projection range is connecting line KG, however connecting line KG is not a perpendicular distance between the projector and the projection plane. At this moment, a rotatable range finder on a left side of the projector needs to be started to scan the distance from the direction of the projection optical machine to the rear of the projector to obtain the shortest distance FJ. Thereby, a cosine value of angle FJG is obtained, i.e., FJ/GJ.

FIG. 8(a) and FIG. 8(b) are two schematic views which illustrate the situation that the left side of the projector is close to the projection plane. The principle for the situation that the right side is close to the projection plane is the same as that of the situation that the left side is close to the projection plane and thus is not repetitively described here.

Figure 9:
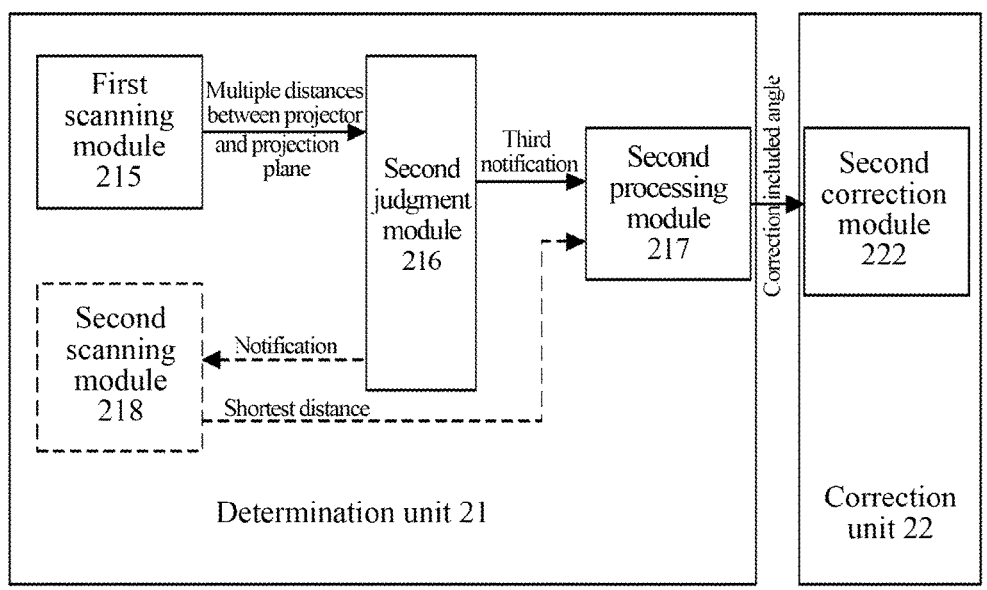
FIG. 9 illustrates a structural schematic diagram of another apparatus for correcting trapezoidal distortion of a projection plane according to an embodiment of the present disclosure.

FIG. 9 illustrates a structural schematic diagram of components of another apparatus for correcting trapezoidal distortion of a projection plane according to FIG. 2. As illustrated in FIG. 9, the determination unit 21 includes: a first scanning module 215, a second judgment module 216 and a second processing module 217; and the correction unit 22 includes: a second correction module 222.

The first scanning module 215 is configured to: scan from the direction of any projection boundary to the direction of another projection boundary of the projector to obtain multiple distances between the projector and the projection plane, and output the multiple distances to the second judgment module 216.

The second judgment module 216 is configured to: determine that the multiple distances obtained through scanning have a trend of changing from great to small and then changing from small to great, and send a third notification to the second processing module 217.

The second processing module 217 is configured to: when the third notification is received, determine that the correction included angle is an included angle between the projector along a projection center line and the direction of the shortest distance, i.e., an actual included angle between the projection on the horizontal plane and the projection plane; and output the correction included angle to the second correction module 222.

The second correction module 222 is configured to: correct trapezoidal distortion according to the determined correction included angle.

The apparatus illustrated in FIG. 9 further includes a second scanning module 218; at this moment, the second judgment module 216 is further configured to: determine that the multiple distances obtained through scanning do not have a trend of changing from great to small and then changing from small to great, and send a notification to the second scanning module 218;

the second scanning module 218 is configured to: receive the notification coming from the second judgment module 216, and scan from the direction of the projection center line of the projector to a rear of the projector to obtain multiple distances between the projector and the projection plane, so as to determine the shortest distance between the projector and the projection plane; and output the obtained shortest distance to the second processing module 217; and the second processing module 217 is further configured to: determine the correction included angle according to that a cosine value of the correction included angle is a ratio of the shortest distance to the distance between the projector along the projection center line and the projection plane, and output the correction included angle to the second correction module 222.

The apparatus illustrated in FIG. 2, the apparatus illustrated in FIG. 6 and/or the apparatus illustrated in FIG. 9 according to the embodiment of the present disclosure are arranged in the projector.

Figure 10:
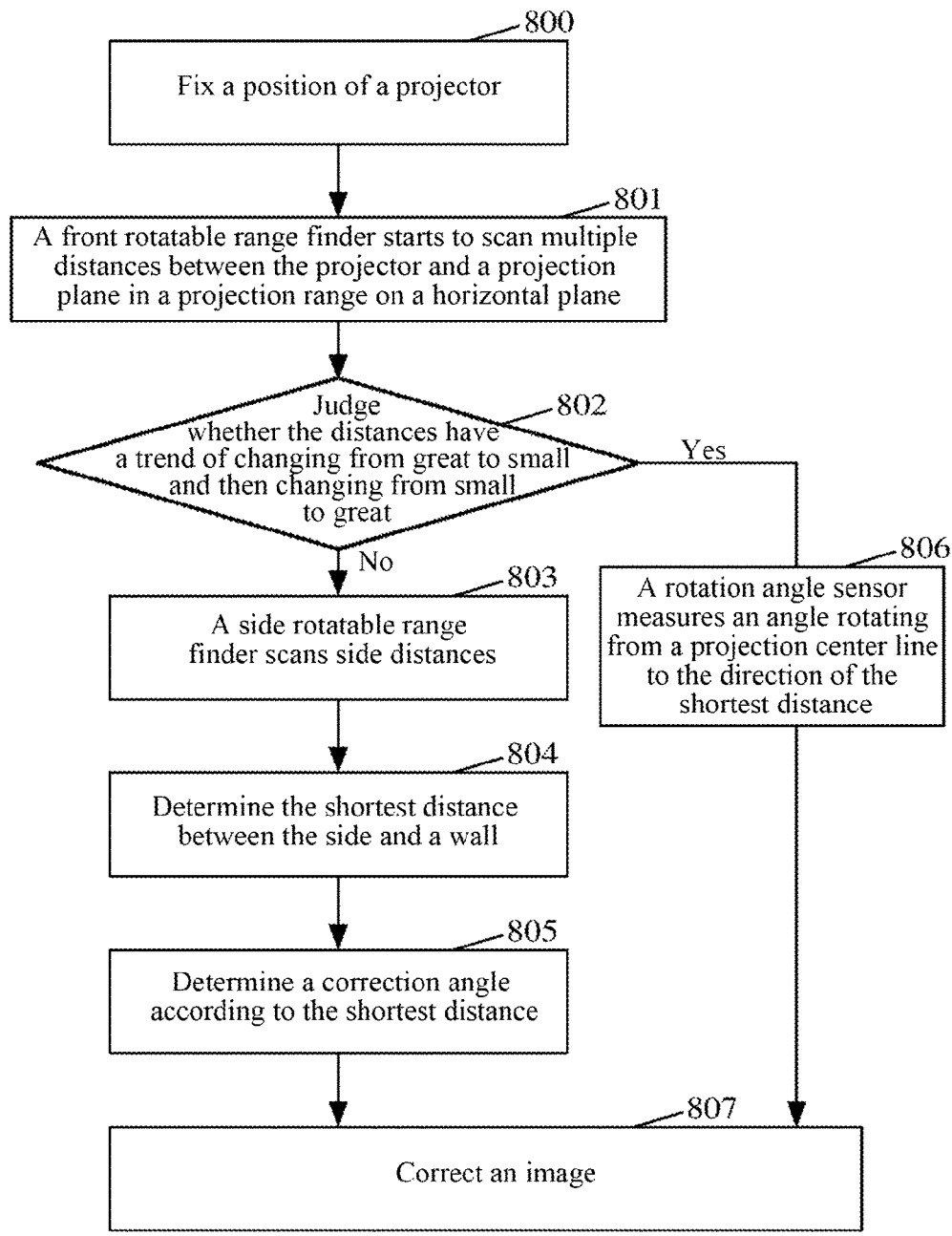
FIG. 10 illustrates a flowchart of one embodiment based on the method illustrated in FIG. 7 according to an embodiment of the present disclosure.

FIG. 10 illustrates a flowchart of one embodiment based on the method illustrated in FIG. 7 according to the present disclosure. As illustrated in FIG. 10, the process includes the following steps.

In step 800, a position of a projector is fixed, i.e., i.e., a projector detects that a position does not change any longer at this moment.

In step 801, a front rotatable range finder of the projector starts to scan distances to a wall surface in a projection range from any projection boundary to obtain multiple distance values.

In step 802, whether the scanned distances have a trend of changing from great to small and then changing from small to great in the projection range is judged, if yes, step 806 is executed; and if not, step 803 is executed.

In step 803, a side rotatable range finder starts to scan distances from one projection boundary with a shorter distance to a projection plane to a rear of the projector, i.e., scan side distances.

In step 804, the shortest distance between the side of the projector and the projection plane, i.e., perpendicular distance, is obtained through scanning.

In step 805, a correction included angle, i.e., an included angle between the projector on a horizontal plane and the projection plane, is obtained according to cosine theorem. A cosine value of the correction included angle is a ratio of the determined shortest distance to the distance between the projector along a projection center line and the projection plane. Then, step 807 is executed.

In step 806, an included angle between the direction of the projection center line and the direction of the shortest distance is determined by a rotation angle sensor, i.e., a correction included angle is obtained, and then step 807 is executed.

In step 807, an image is corrected according to the obtained correction included angle, i.e., an included angle between the projector and the projection plane, and the corrected image is output by a projection optical machine.

One skilled in the art can understand that all or partial steps in the above-mentioned embodiments may be implemented by using a computer program process, the computer program may be stored in a computer-readable storage medium, the computer program is executed on a corresponding hardware platform (e.g., a system, equipment, an apparatus or a device), and when being executed, it includes one or combinations of the steps of the method embodiments.

Alternatively, all or partial steps in the above-mentioned embodiments may also be implemented by using integrated circuits, and these steps may be respectively manufactured into individual integrated circuit modules, or more modules or steps thereof may be manufactured into a single integrated circuit module to implement.

Each device/function module/function unit in the above-mentioned embodiments may be implemented by using a general-purpose computing device, and they may be integrated on a single computing device and may also be distributed on a network consisting of multiple computing devices.

When devices/function modules/function units in the above-mentioned embodiments are implemented by means of software function module and are sold or used as an independent product, they may be stored in a computer-readable storage medium. The above-mentioned computer-readable storage medium may be a read-only memory, a magnetic disk, a compact disk or the like.

INDUSTRIAL APPLICABILITY

In the embodiments of the present disclosure, by measuring a trend of change in a distance between a projector and a projection plane by using a rotatable range finder and determining a correction included angle according to the obtained trend of change, trapezoidal distortion correction can be automatically and accurately realized. In addition, the embodiments of the present disclosure not only can realize automatic vertical trapezoidal distortion correction, but also can realize automatic horizontal trapezoidal distortion correction. As compared with the related art, the user experience is better.

What we claim is:

1. A method for correcting trapezoidal distortion of a projection plane, comprising: measuring a trend of change in a distance between a projector and a projection plane by using a rotatable range finder, and determining a correction included angle according to the obtained trend of change; and
correcting trapezoidal distortion of the projection plane according to the determined correction included angle;
wherein measuring the distance between the projector and the projection plane by using the rotatable range finder comprises:
scanning from a direction of any projection boundary to a direction of another projection boundary of the projector to obtain a plurality of distances between the projector and the projection plane;
wherein when the trend of change in the distance between the projector and the projection plane measured by using the rotatable range finder comprises: the plurality of distances obtained through scanning have a trend of changing from great to small and then changing from small to great,
correspondingly, determining the correction included angle according to the trend of change as an included angle between the projector along a projection center line and a direction of a shortest distance.

2. The method according to claim 1, wherein, before measuring the trend of change in the distance between the projector and the projection plane by using the rotatable range finder, the method further comprises:
determining an included angle between the projector and a horizontal plane, wherein the included angle is greater than a preset first included angle threshold and an included angle between an upper projection boundary of the projector and the horizontal plane is less than a preset second included angle threshold.

3. The method according to claim 2, wherein:
measuring the distance between the projector and the projection plane by using the rotatable range finder comprises: measuring a first distance between a parallel direction of the projector and the projection plane and a second distance between a direction of the upper projection boundary of the projector and the projection plane by using the rotatable range finder.

4. The method according to claim 3, wherein measuring the trend of change in the distance between the projector and the projection plane by using the rotatable range finder comprises:
when the trend of change from the first distance to the second distance is a decrease trend, determining that the projection plane is in parallel with the horizontal plane; and
when the trend of change from the first distance to the second distance is an increase trend, determining that the projection plane is perpendicular to the horizontal plane.

5. The method according to claim 4, wherein determining the correction included angle according to the trend of change comprises:
when the projection plane is in parallel with the horizontal plane, determining that the correction included angle is an included angle between the projector along a projection center line and the horizontal plane; and
when the projection plane is perpendicular to the horizontal plane, determining that the correction included angle is an included angle between the projector along a projection center line and the projection plane.

6. The method according to claim 2, wherein measuring the distance between the projector and the projection plane by using the rotatable range finder comprises: measuring the second distance between the direction of the upper projection boundary of the projector and the projection plane and a third distance between a direction of a lower projection boundary of the projector and the projection plane.

7. The method according to claim 6, wherein measuring the trend of change in the distance between the projector and the projection plane by using the rotatable range finder comprises:
when the second distance is less than the third distance, determining that the projection plane is in parallel with the horizontal plane; and
when the second distance is greater than the third distance, determining that the projection plane is perpendicular to the horizontal plane.

8. The method according to claim 7, wherein determining the correction included angle according to the trend of change comprises:
when the projection plane is in parallel with the horizontal plane, determining that the correction included angle is an included angle between the projector along a projection center line and the horizontal plane; and
when the projection plane is perpendicular to the horizontal plane, determining that the correction included angle is an included angle between the projector along a projection center line and the projection plane.

9. The method according to claim 2, wherein the method further comprises:
when the determined included angle between the projector and the horizontal plane is less than the first included angle threshold, determining that the projection plane is perpendicular to the horizontal plane; and
when the included angle between the upper projection boundary of the projector and the horizontal plane is greater than the second included angle threshold, determining that the projection plane is in parallel with the horizontal plane.

10. The method according to claim 9, wherein determining the correction included angle according to the trend of change comprises:
when the projection plane is in parallel with the horizontal plane, determining that the correction included angle is an included angle between the projector along a projection center line and the horizontal plane; and
when the projection plane is perpendicular to the horizontal plane, determining that the correction included angle is an included angle between the projector along a projection center line and the projection plane.

11. The method according to claim 1, wherein when the trend of change in the distance between the projector and the projection plane measured by using the rotatable range finder comprises: the plurality of distances obtained through scanning do not have a trend of changing from great to small and then changing from small to great, the method further comprises: scanning from a direction of the projection center line of the projector to a rear of the projector to obtain a plurality of distances between the projector and the projection plane, to determine a shortest distance between the projector and the projection plane; and correspondingly, determining the correction included angle according to the trend of change as a correction included angle whose cosine value is a ratio of the shortest distance to the distance between the projector along the projection center line and the projection plane.

12. A computer-readable storage medium, storing computer-executable instructions used for executing the method according to claim 1.

13. An apparatus for correcting trapezoidal distortion of a projection plane, comprising a determination unit and a correction unit, wherein:

the determination unit is configured to: measure a trend of change in a distance between a projector and a projection plane by using a rotatable range finder, and determine a correction included angle according to the obtained trend of change; and the correction unit is configured to: correct trapezoidal distortion of the projection plane according to the determined correction included angle;

wherein the determination unit comprises: a first scanning module, a second judgment module and a second processing module; and the correction unit comprises: a second correction module, wherein, the first scanning module is configured to: scan from a direction of any projection boundary to a direction of another projection boundary of the projector to obtain a plurality of distances between the projector and the projection plane, and output the plurality of distances to the second judgment module;

the second judgment module is configured to: determine that the plurality of distances obtained through scanning have a trend of changing from great to small and then changing from small to great, and send a third notification to the second processing module;

the second processing module is configured to: when the third notification is received, determine that the correction included angle is an included angle between the projector along a projection center line and a direction of a shortest distance; and output the correction included angle to the second correction module; and the second correction module is configured to: correct trapezoidal distortion according to the determined correction included angle.

14. The apparatus according to claim 13, wherein the determination unit comprises: a first measurement module, a second measurement module, a first judgment module and a first processing module; and the correction unit comprises: a first correction module, wherein, the first measurement module is configured to: determine an included angle between the projector and a horizontal plane, and output the included angle to the first judgment module;

the second measurement module is configured to: determine an included angle between an upper projection boundary of the projector and the horizontal plane, and output the included angle to the first judgment module;

the first judgment module is configured to: determine whether the projection plane is perpendicular to the horizontal plane or in parallel with the horizontal plane according to the included angle between the projector and the horizontal plane coming from the first measurement module, the included angle between the upper projection boundary of the projector and the horizontal plane coming from the second measurement module and the trend of change in the distance between the projector and the projection plane, and output a first notification or a second notification to the first processing module;

the first processing module is configured to: when the first notification is received, determine that the correction included angle is an included angle between the projector along a projection center line and the horizontal plane; and when the second notification is received, determine that the correction included angle is an included angle between the projector along a projection center line and a wall surface, and output the determined correction included angle to the first correction module; and the first correction module is configured to: correct trapezoidal distortion according to the determined correction included angle.

* * * * *